Oct. 14, 1958   G. A. MITCHELL   2,856,080
STOCK SUPPORTING AND CONVEYING APPARATUS
Filed Nov. 6, 1956   2 Sheets-Sheet 1
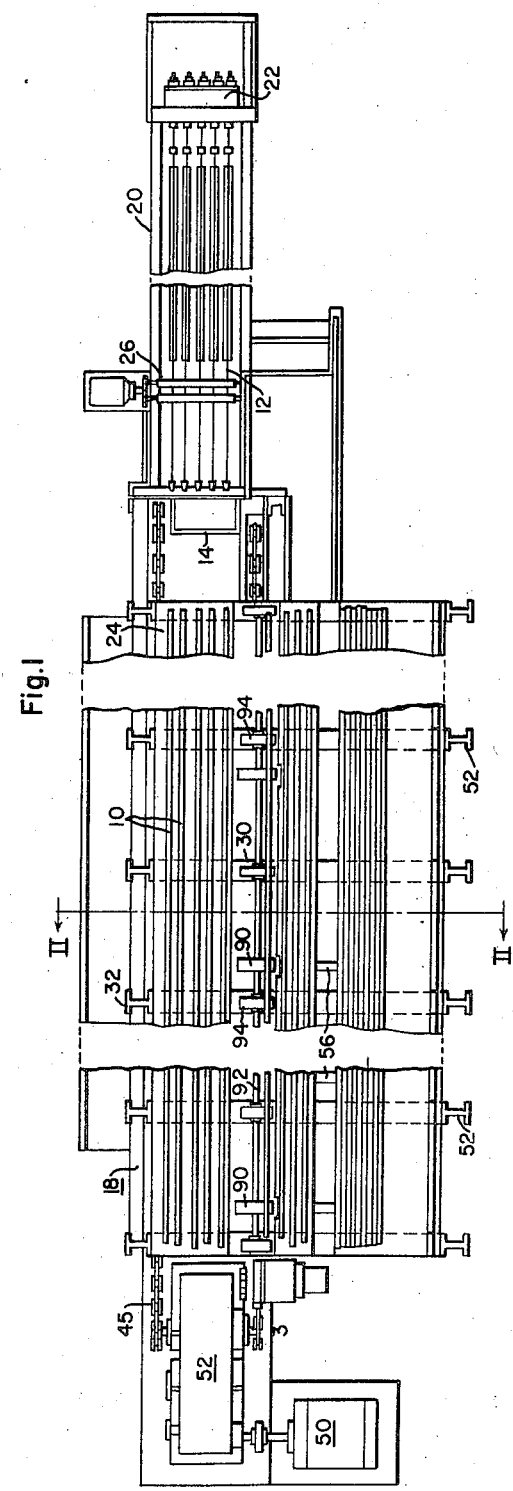
INVENTOR
George A. Mitchell
By
ATTORNEY Oct. 14, 1958  G. A. MITCHELL  2,856,080
STOCK SUPPORTING AND CONVEYING APPARATUS
Filed Nov. 6, 1956  2 Sheets-Sheet 2
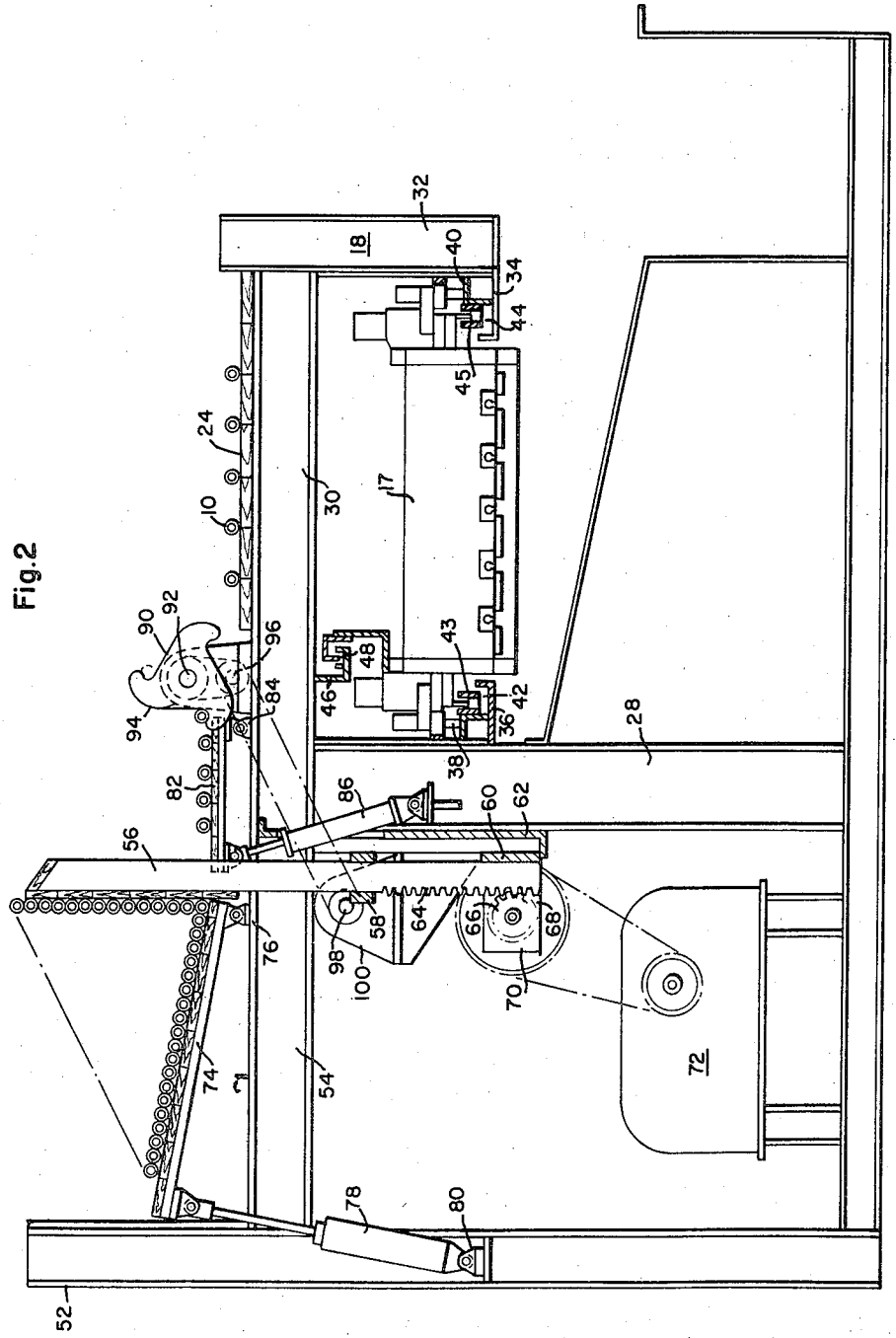

United States Patent Office 2,856,080
Patented Oct. 14, 1958

2,856,080

STOCK SUPPORTING AND CONVEYING APPARATUS

George A. Mitchell, Youngstown, Ohio, assignor to Lombard Corporation, Youngstown, Ohio, a corporation of Ohio Application November 6, 1956, Serial No. 620,665

5 Claims. (Cl. 214—8.5)

This invention relates generally to stock handling devices and more particularly to a device for conveying elongated tubes or the like from a storage rack to a work table or other appropriate receiving means. The invention finds particular, but by no means exclusive, utility when used for feeding a procession of tubular workpieces one by one to a drawbench receiving rack preparatory to their being loaded onto the drawbench mandrels.

One object of the invention is to provide a novel mechanism for withdrawing elongated tubular members from a source of supply and for conveying them one by one to a receiving means.

Another object of the invention is to provide means for discharging elongated tubes from a storage bin a few at a time in on orderly and controlled manner.

As will become apparent from the following detailed description, the embodiment of the present invention shown herein provides a tube storage rack having a pair of spaced vertical supporting members between which the tubes are carried. One of the supporting members is adapted to move downwardly and the floor of the storage bin is adapted to tilt toward the downwardly-moving support so that tubes at the top of the bin will topple over the upper extremity of the supporting member as it moves downwardly and onto an inclined way which directs them to conveying apparatus. The invention is particularly useful in installations where the length and weight of the tubes makes it impractical or difficult to handle them manually.

The above and other objects and features of the invention will become apparent from the following detailed description taken in connection with the accompanying drawings which form a part of this specification and in which:

Figure 1 is a top view of the present invention shown in connection with a conventional drawbench; and Figure 2 is a sectional view taken along line II—II of Figure 1.

Referring to Figures 1 and 2, there is shown a drawbench of the type in which one or more tubes 10 are loaded onto mandrels 12 and then drawn through dies in a die block 14 by means of a draw carriage 17 (Fig. 2) which travels on a track structure 18 extending parallel to the central axes of the dies. Extending to the right of the die block 14 is an elongated mandrel supporting table 20 which has means 22 at its extreme right end for manipulating and anchoring the plurality of mandrel rods 12 corresponding to the number of dies. Each of the mandrels has an enlarged head at its left end which fits into a corresponding die during a drawing operation.

In conventional tube drawing practice, a plurality of tube blanks are loaded onto a receiving table 24 positioned above the track structure 18. To load tubes onto the mandrels, the enlarged ends of the mandrels are raised above the dies to the plane of the receiving platform, and the tubes are passed over the enlarged ends by a pair of pinch rolls 26. After the loading operation, the mandrels are lowered into axial alignment with the dies and the enlarged ends of the mandrels are forced into the dies. Thereafter, the leading ends of the tubes which extend through the dies are gripped by the draw carriage 17 which, when moved away from the die block 14, carries the tube blanks with it. The tubes are thereby reduced to the dimensions of the annular opening between the inner periphery of a die and the outer periphery of the enlarged head of the mandrel which extends into the die.

Although the foregoing functional description of the drawbench will suffice for purposes of the present invention, a full and detailed description of the construction and operation of the drawbench may be had by reference to copending application Serial No. 430,122, filed May 17, 1954 and assigned to the assignee of the present application.

As will be understood, the complete track structure 18 incorporates a plurality of spaced frame sections, one of which is shown in Figure 2. Each of these sections may be fabricated of ordinary structural members welded or otherwise securely fastened together and comprises an upright member 28 and a horizontally disposed cantilever beam 30 extending outwardly from the upright member 28. Depending downwardly from the outer end of the cantilever beam 30 is a short beam section 32 which carries at its lower end a track support 34. The support 34 is one of a complementary pair, a second support 36 being carried by the post 28, as shown.

Carried by the supports 34 and 36 of each of the frame sections are spaced tracks 38 and 40 which may, for example, be elongated sections of angle iron. The tracks 38 and 40 support the draw carriage against gravity and guide it in longitudinal movement throughout the length of the track assembly. Adjacent and slightly below each of the track supports 34 and 36 are guiding and supporting channels 42 and 44 for a pair of spaced draw chains 43 and 45 which are employed to draw the carriage 17 along the tracks 38 and 40 during a drawing operation. Supported in depending relation from the cantilever member 30 is another channel 46 which supports and guides a third chain 48 which is utilized in the illustrated apparatus as a "return" chain for returning the carriage 17 to its initial position immediately following a drawing operation. At the left-hand end of the drawbench assembly (Fig. 1) there is provided a heavy duty drive motor 50 and gear reducer 52, the latter of which has driving connection with chains 43 and 45 for effecting synchronous movement thereof in the manner desired.

The present invention per se is concerned with means for storing and conveying tubular stock to the receiving platform 24 of the drawbench. As shown in Figure 2, a series of upright supporting members 52 are spaced along the length of track assembly 18 opposite the upright members 28. A plurality of horizontally disposed members 54 span the space between supporting members 28 and 52 to effectively form an extension of the cantilever beams 30.

Adjacent members 28 are a second plurality of upright supporting members 56 which, together with members 52 and 54, form a storage area for the tubular stock. Members 56 are free to reciprocate in bearings 58 and 60 which are securely fastened to members 28 by means of a plate 62. One side of the lower portion of each of the supporting members 56 is provided with rack teeth at 64 to mesh with an associated one of a plurality of gears 66 disposed within gear casings 68. Each of the gears 66 is carried on a shaft 70 which is driven by a motor and gear reducer mechanism 72. As will be understood, the arrangement is such that when shaft 70 is rotated by mechanism 72, supporting members 56 will be lowered or raised, depending upon the direction of rotation of shaft 70.

A stock supporting base 74 extends along the length of the track structure 18 and has its side adjacent members 56 hinged at 76 to the horizontal spanning members 54. For rotating base 74 about its hinged connection, a plurality of fluid motors 78 are pivotally connected to the upright supporting members 52 at 80. As shown, the piston rods of the fluid motors 78 are pivotally connected to the free edge of the stock supporting base 74 such that when the fluid motors are pressurized by a source of fluid pressure (not shown), the supporting base will be forced to tilt toward the vertically movable supporting members 56.

On the side of supporting members 56 opposite base 74 is a second stock supporting base 82 having one edge hinged to the cantilever beams 30 at 84 and its other edge pivotally connected to the piston rods of a second plurality of fluid motors 86. The fluid motors 86 are, in turn, pivotally connected to the supporting beams 28 such that when they are pressurized by a source of fluid pressure, not shown, the stock supporting base 82 will be forced to pivot about its hinged connection.

Adjacent the hinged edge of base 82 are a plurality of spaced star wheels 90 carried on a shaft 92 which is journalled in bearings 94. These bearings are, in turn, supported on the cantilever beams 30. Shaft 92 is operatively connected to a second shaft 96, the latter of which is connected through a chain drive to a third shaft 98 carried in bearings 100 which are supported on upright members 28. A prime mover, not shown, is operatively connected to shaft 98 to impart rotational movement to star wheels 90 which act to transfer the tube blanks one by one from base 82 to receiving platform 24.

As shown, members 52, 56, 74, and 82 and the floor of receiving platform 24 are lined with wood or other suitable material to cushion the impact of tube blanks against these members.

In operation, the storage bin defined by members 52, 74 and 56 is first loaded with a plurality of tube blanks. To unload the tube blanks from the storage bin, the vertically movable supporting members 56 are lowered by motor and gear reducer mechanism 72, thereby allowing a portion of the tube blanks to topple over the upper ends of members 56 and onto base 82. As members 56 are lowered, a point will obviously be reached where the tube blanks at the right hand portion of the bin will be discharged onto base 82 while the blanks adjacent supporting members 52 will remain. To facilitate removal of all of the blanks in the bin, fluid motors 78 are provided to tilt the stock supporting base 74 toward supporting members 56, the result being to force all of the tube blanks to the right hand side of the bin where they may be discharged. In actual practice, fluid motors 78 will tilt the stock supporting base 74 while members 56 move downward so that the members 56 can always control the rate of discharge of the tubes and prevent an avalanche of the same.

The stock supporting base member 82 and fluid motors 86 are used to direct the tubes which fall over the extremities of members 56 toward star wheels 90 which transfer them one by one to the receiving platform 24.

As will be understood, the arrangement is such that a controlled number of tube blanks may be automatically transferred from the storage bin to the receiving platform 24. Although the invention has been shown in connection with a certain specific embodiment, it will be readily apparent to those skilled in the art that various changes in form and arrangement of parts may be made to suit requirements without departing from the spirit and scope of the invention.

I claim as my invention:

1. Stock supporting and conveying apparatus for elongated tubes and the like comprising, in combination, a stationary frame member, an elongated stock supporting base having one of its long transverse sides hinged to said frame member, a first plurality of upright side members spaced along the other long transverse side of said stock supporting base, a second plurality of upright and vertically movable side members spaced along said one long transverse side of said stock supporting base, a controllable motor for selectively tilting the supporting base about its hinged connection toward the second plurality of side members whereby stock carried on the base will be deflected toward the vertically movable side members in an orderly and controlled manner, a second elongated stock supporting base having one long transverse side extending along the vertically movable side members opposite the first-mentioned stock supporting base, and a plurality of star wheels spaced along the other long transverse side of the second stock supporting base whereby tubes which fall over the upper extremities of said vertically movable side members will fall onto said second stock supporting base and move thereacross to be picked up by said star wheels.

2. The combination claimed in claim 1 and including means for selectively tilting said second stock supporting base toward said star wheels.

3. Stock supporting and conveying apparatus for elongated tubes and the like comprising, in combination, a stationary frame member, an elongated stock supporting base having one of its long transverse sides hinged to said frame member, an upright side member placed along the other of the long transverse sides of said stock supporting base, a second vertically movable upright side member placed along said one long transverse side of said stock supporting base, a second elongated stock supporting base having one long transverse side extending parallel to the long transverse dimension of said first-mentioned base on the side of said second upright member opposite said other base, the other long transverse side of said second base being hinged to said frame member, and selectively controllable motors for tilting said first and second bases toward said vertically movable side member and said other long transverse side of the second base respectively.

4. Stock supporting and conveying apparatus for elongated tubular members comprising, in combination, a stationary frame member, an elongated tube supporting base having one of its long transverse sides hinged to said frame member, a first plurality of upright and vertically movable side members spaced along said one long transverse side of the tube supporting base, a gear rack formed on one face of each of said vertically movable side members, a plurality of gear members each of which operatively engages a gear rack on an associated one of said vertically movable side members, means for rotating said gear members in unison whereby the said side members are simultaneously moved in a vertical direction, a second plurality of upright side members spaced along the other long transverse side of the tube supporting base, a first expansible fluid motor pivotally connected between said stationary frame member and said other side of the tube supporting base for selectively tilting the supporting base about its hinged connection toward the vertically movable side members whereby elongated tubular members carried on the base will be deflected toward said vertically movable side members, a second elongated tube supporting base having one long transverse side extending along the vertically movable side members opposite the first-mentioned stock supporting base, a plurality of star wheels spaced along the other long transverse side of the second tube supporting base, means pivotally connecting the other long transverse side of the second tube supporting base adjacent said star wheels to said stationary frame member, and a second expansible fluid motor pivotally connected between said stationary frame member and said one long transverse side of the second tube supporting base for selectively rotating said second base about its hinged connection to deflect tubes on the second base toward said star wheels.

5. Stock supporting and conveying apparatus for elongated tubular members comprising, in combination, a stationary frame member, an elongated tube supporting base having one of its long transverse sides hinged to said frame member, a first plurality of upright and vertically movable side members spaced along said one long transverse side of the tube supporting base, a second plurality of upright side members spaced along the other long transverse side of the tube supporting base, a first expansible fluid motor pivotally connected between said stationary frame member and said other side of the tube supporting base for selectively tilting the supporting base about its hinged connection toward the vertically movable side members, a second elongated tube supporting base having one long transverse side extending along the vertically movable side members opposite said first-mentioned tube supporting base, means pivotally connecting the other long transverse side of the second tube supporting base to said stationary frame member, and a second expansible fluid motor pivotally connected between said stationary frame member and said one long transverse side of the second tube supporting base for selectively rotating said second base about its hinged connection to the stationary frame.

References Cited in the file of this patent
UNITED STATES PATENTS

| | | |
|---|---|---|
| 388,369 | Morse et al. | Aug. 21, 1888 |
| 883,032 | Link | Mar. 24, 1908 |
| 1,272,472 | Lohman | July 16, 1918 |
| 1,686,088 | Horstkotte | Oct. 2, 1928 |
| 2,753,058 | Potthoff et al. | July 3, 1956 |